United States Patent
Xu et al.

(10) Patent No.: US 10,969,115 B2
(45) Date of Patent: Apr. 6, 2021

(54) SMOKE FILTER DEVICE AND RANGE HOOD WITH THE SAME

(71) Applicant: Ningbo Fotile Kitchen Ware Co., Ltd., Ningbo (CN)

(72) Inventors: Zhineng Xu, Ningbo (CN); Ting Yu, Ningbo (CN)

(73) Assignee: Ningbo Fotile Kitchen Ware Co., Ltd., Ningbo (CN)

( * ) Notice: Subject to any disclaimer, the term of this patent is extended or adjusted under 35 U.S.C. 154(b) by 56 days.

(21) Appl. No.: 16/419,915

(22) Filed: May 22, 2019

(65) Prior Publication Data

US 2019/0376694 A1 Dec. 12, 2019

(30) Foreign Application Priority Data

May 28, 2018 (CN) .......................... 201810563573.3

(51) Int. Cl.
  *F24C 15/20* (2006.01)
  *B01D 46/00* (2006.01)
  *B01D 46/40* (2006.01)

(52) U.S. Cl.
  CPC ...... *F24C 15/2035* (2013.01); *B01D 46/0005* (2013.01); *B01D 46/40* (2013.01); *F24C 15/2042* (2013.01); *B01D 2265/028* (2013.01); *B01D 2267/70* (2013.01); *B01D 2279/35* (2013.01)

(58) Field of Classification Search
  CPC .. F24C 15/2035; F24C 15/20; F24C 15/2042; B01D 2279/35; B01D 46/0005; B01D 46/40; B01D 2265/028; B01D 2267/70
  See application file for complete search history.

(56) References Cited

U.S. PATENT DOCUMENTS

| 5,342,422 A * | 8/1994 | Wimbock | B01D 45/08 55/444 |
| 2017/0007951 A1* | 1/2017 | DeChristofaro | B01D 46/10 |
| 2018/0259195 A1* | 9/2018 | Peng | F24C 15/2021 |
| 2019/0360701 A1* | 11/2019 | Xu | F24C 15/2042 |
| 2020/0340682 A1* | 10/2020 | Deng | F24C 15/20 |

* cited by examiner

*Primary Examiner* — Robert Clemente
(74) *Attorney, Agent, or Firm* — Wang Law Firm, Inc.

(57) ABSTRACT

The present invention discloses a smoke filter device, which comprises a plurality of oil filter sections (10), each oil filter section (10) has at least two filter holes (11); and in the two adjacent two filter holes (11), an area defined by the filter hole (11) near the at the end of the oil filter section (10) is smaller than an area defined by the filter hole (11) near the middle portion of the oil filter section (10). The present invention also discloses to a range hood with the smoke filter device. In the present invention, without changing the overall air volume, the suction force of the filter holes at the end of each oil filter section is increased, so that the smoke can be further prevented from escaping to the surrounding.

14 Claims, 14 Drawing Sheets

SMOKE FILTER DEVICE AND RANGE HOOD WITH THE SAME

RELATE APPLICATIONS

This application claims benefit to Chinese Patent Application for a smoke filter device and a range hood thereof, 201810563573.3, filed on May 28, 2018. The specification of the application is incorporated here by this reference.

FIELD OF THE INVENTION

The present invention relates to the technical field of range hoods, and in particular to a smoke filter device and a range hood thereof.

DESCRIPTION OF THE PRIOR ART

For side-suction range hoods (also referred to as close-suction range hoods), a smoke filter device structure is generally mounted at an air inlet. The smoke filter device structure can play a role of condensing smoke, dredging air ducts and the like, and can also prevent unexpected objects from entering the cavity of the range hood. Since a side-suction range hood is mounted at a lower height closer to the smoke source, it is very easy to have a large amount of smoke stuck to the side-suction range hood. Therefore, the cleaning of the smoke filter device is particularly important in the routine maintenance of the range hood. However, the existing smoke filter devices are generally non-detachable. The smoke filter devices can only be scrubbed externally during the daily cleaning. As a result, it is unable to completely clean the smoke filter devices. If it is necessary to completely clean the smoke filter device, the range hood needs to be disassembled and the whole smoke filter device needs to be taken down. This operation is troublesome and also requires certain professional knowledge. Moreover, it is inconvenient for cleaning since the smoke filter device is long, for example, the smoke filter device disclosed in a Chinese Patent CN104329708A (Patent No.: ZL201410537477.3).

In addition, filter holes on an existing smoke filter device are the same in size and uniformly distributed on a mesh of the smoke filter device. Although it is convenient to manufacture the smoke filter device, no optimal smoke filtering effect of the smoke filter device will be realized. The existing stoves are generally stoves with multiple burners (two or more burners) which are, usually, bilaterally symmetrical to each other. In practical applications, the source of smoke in the stove is actually not located below the inlet in the center of the range hood. Therefore, the smoke filtering effect of the existing smoke filter devices is poor. Although an existing range hood with a double-fan system is designed with two smoke suction centers, the escape of smoke to the surrounding may occur due to the week suction on two sides of the smoke filter device.

SUMMARY OF THE INVENTION

A first technical problem to be solved by the present invention in accordance with the existing technology is to provide a smoke filter device which can effectively prevent smoke from escaping.

A second technical problem to be solved by the present invention in accordance with the existing technology is to provide a smoke filter device which can effectively prevent smoke from escaping and be convenient for cleaning.

A third technical problem to be solved by the present invention in accordance with the existing technology is to provide a range hood which can effectively prevent smoke from escaping.

A forth technical problem to be solved by the present invention in accordance with the existing technology is to provide a range hood which can effectively prevent smoke from escaping and be convenient for cleaning.

To solve the first technical problem, the smoke filter device, comprises a plurality of oil filter sections each having a middle portion and two ends, each oil filter section has at least two filter holes, which are arranged in parallel along a lengthwise direction of the oil filter section; and in the adjacent two filter holes, an area defined by the filter hole near the at least one end of the oil filter section is smaller than an area defined by the filter hole near the middle portion of the oil filter section.

To further prevent smoke from escaping to the surrounding, preferably, in the adjacent two filter holes, an area defined by the filter hole near each end of the oil filter section is smaller than an area defined by the filter hole near the middle portion of the oil filter section. In this way, without changing the overall air volume, the suction force applied to the smoke by the filter holes at two ends of each oil filter section is increased, so that the smoke can be further prevented from escaping to the surrounding and the overall smoke suction effect of the filter device can be improved.

Preferably, the smoke filter device further comprises a screen plate, and the at least two oil filter sections are arranged in parallel on the screen plate along a lengthwise direction of the screen plate. In this way, while ensuring a large suction force in the middle portion of each oil filer section and increasing the suction force on two sides of the screen plate, the smoke can be prevented from escaping to the middle portion of the stove by properly increasing the suction force of the filter holes at the junction of the two oil filter sections. Accordingly, the smoke suction efficiency of the smoke filter device is further improved, the uniformity of suction force across the smoke filter device can be significantly improved, and the noise generated during the operation of the smoke filter device can be reduced to some extent.

Preferably, two oil filter sections are contiguously arranged along the lengthwise direction of the screen plate, and an area defined by each the filter holes adjacent to the end of each oil filter section is the smallest among all areas defined by the filter holes on this oil filter section. Therefore, the smoke can be further prevented from escaping to the surrounding.

The area of the filter holes can be changed in various ways. Since the filter holes on the existing smoke filter devices are generally long holes, it is convenient to make improvements on the basis of the existing smoke filter devices. Preferably, a length of each filter hole extends along a widthwise direction of a corresponding oil filter section, and the filter holes have same width.

Preferably, the screen plate is divided into multiple oil filter sections, each the oil filter sections is in plate, and two adjacent oil filter sections are movably connected with each other. In this way, the oil filter device can be folded after being removed from the range hood. It is convenient for a user to clean the smoke filter device.

To further solve the second technical problem, preferably, each the oil filter section can flip to be superimposed with the adjacent oil filter section. By folding the oil filter device, the length of the smoke filter device can be minimized. The overall length of the smoke filter device can be reduced to the length of a single oil filter section. In this way, it is greatly convenient for the user to clean the smoke filter device, and the user can directly clean the folded smoke filter device in a sink. Moreover, since the length is greatly reduced, the folded smoke filter device can also be directly put in a dishwasher to be automatically cleaned.

Preferably, a locking mechanism is disposed on the screen plate; the locking mechanism comprises: a first locking member and a second locking member, which are separately disposed on two adjacent oil filter sections; when two adjacent oil filter sections are superimposed with each other, the first locking member and the second locking member can be locked with each other. By locking the smoke filter device through the locking mechanism, the folded smoke filter device can be prevented from unfolding during the cleaning process due to the relative rotation of the oil filter sections.

Preferably, the first locking member is a touch buckle, and the second locking member is a touch buckle seat into which the touch buckle is clamped therein. The touch buckle can be clamped into the touch buckle seat immediately when the smoke filter device is folded, so that the smoke filter device is easily locked.

To solve the third technical problem, a range hood with the above said smoke filter device is provided.

To further solve the fourth technical problem, preferably, the range hood comprises: a smoke collecting hood; a panel and the smoke filter device, which are disposed on the smoke collecting hood; an oil guide plate disposed within the smoke collecting hood; the smoke filter device is disposed above the panel; and one of the upper and lower ends of the screen plate is in plug-in or snap-in connection to a top end of the panel, while the other one thereof is in plug-in or snap-in connection to an upper end of the oil guide plate. Therefore, the operation of assembly and disassembly of the smoke filter device becomes more convenient, and it is convenient for the user to clean the smoke filter device after the disassembly.

Preferably, a pin protrudes downward from the lower end of the screen plate; a through hole into which the pin is inserted is formed on the top of the panel, and the through hole is wider than the length of the pin; and the through hole is wider than the length of the pin; the upper end of the screen plate and the upper end of the oil guide plate form a snap connection through a snap mechanism; the snap mechanism comprises a first snap fastener disposed at the upper end of the screen plate and a second snap fastener disposed at the upper end of the oil guide plate; and the first snap fastener is one of a touch buckle and a touch buckle seat, while the second snap fastener is the other one of the touch buckle and the touch buckle seat. Since the pin is in clearance fit with the through hole, during the mounting of the smoke filter device, first, the pin is inserted into the through hole. Due to the clearance fit of the pin with the through hole, by adjusting the position of the smoke filter device, the first snap fastener can be successfully snapped with the second snap fastener. Then, the smoke filter device is mounted.

Preferably, a mounting plate protrudes toward an inner cavity of the smoke collecting hood is disposed at the top end of the panel in the lengthwise direction of the panel; the through hole is formed on the mounting plate; and the pin is platy and formed by extending the surface of the screen plate downward. In this way, oil liquid accumulated on the smoke filter device can flow to the back of the panel through the through hole along the pin and then flow into an oil cup from the back of the panel.

Preferably, a top edge of the screen plate obliquely extends upward towards the back side of the screen plate in the lengthwise direction of the screen plate to form an upper flanging. Accordingly, the accumulation of oil liquid on the top of the smoke filter device can be avoided, and the top of the smoke filter device can be further prevented from adhering to the oil guide plate if the smoke filter device has been not cleaned for a long period of time.

Preferably, a left side edge, a right side edge and a lower edge of the screen plate extend towards the back side of the screen plate to form a left flanging, a right flanging and a lower flanging, respectively; upper ends of the left flanging and the right flanging are integrally connected to a corresponding end of the upper flanging; and oil guide gaps are formed between a lower end of the left flanging and a corresponding end of the lower flanging and between a lower end of the right flanging and the corresponding end of the lower flanging, respectively. The range hood may be slightly inclined during the actual mounting process. Under such situation, oil liquid will be accumulated and condensed at a lower position on the back of the smoke filter device. In the present invention, by providing the oil guide gaps, oil liquid on the back of the smoke filter device can be allowed to flow to the back of the panel through the oil guide gaps and then flow into the oil cup.

Compared with the prior art, the present invention has following advantages: as most part of smoke generated by cooking directly rises and is taken away by the range hood, and small part of smoke escapes around the burner of the stove; in the present invention, in the adjacent two filter holes, an area defined by the filter hole near each end of the oil filter section is smaller than an area defined by the filter hole near the middle portion of the oil filter section, accordingly, without changing the overall air volume, the suction force applied to the smoke by the filter holes adjacent to one end of each oil filter section is increased, so that, the smoke can be further prevented from escaping to the surrounding, and the overall smoke suction effect of the filter device can be improved.

DETAILED DESCRIPTION OF THE PREFERRED EMBODIMENT

Figure 1:
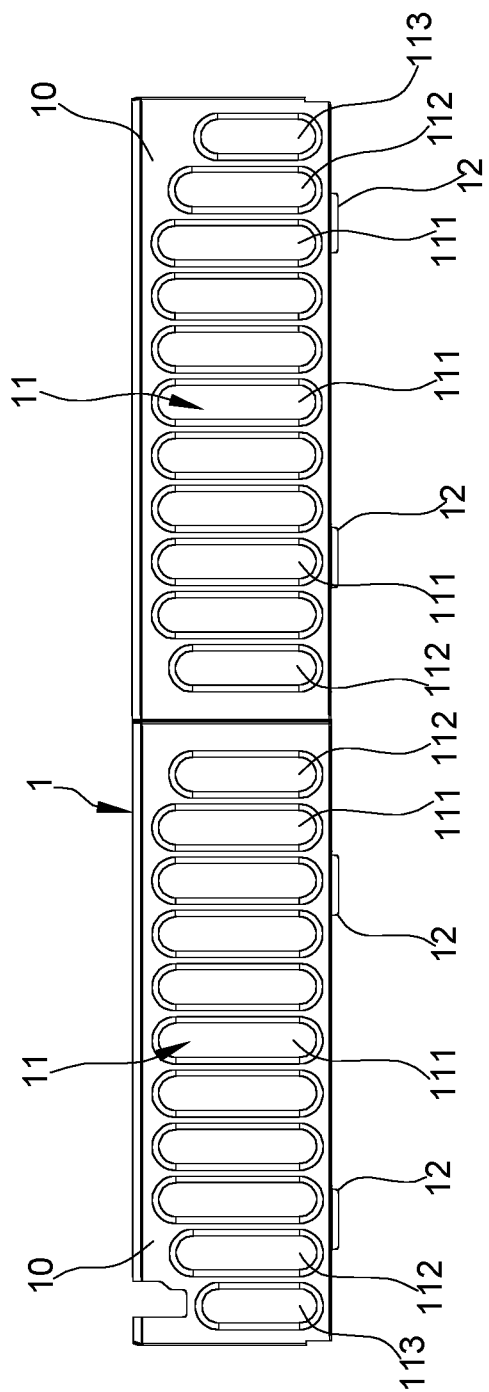
FIG. 1 is a front view of a smoke filter device according to an embodiment of the present invention.
Figure 2:
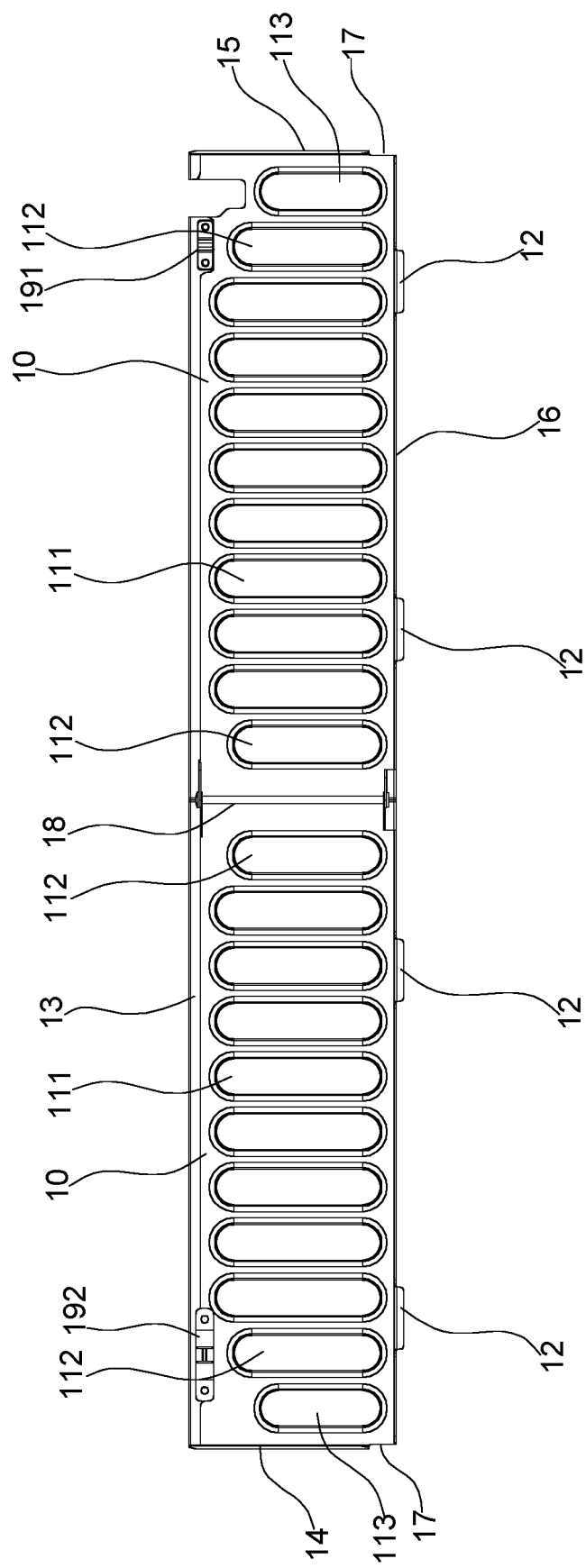
FIG. 2 is a back view of the smoke filter device according to the embodiment of the present invention.
Figure 3:
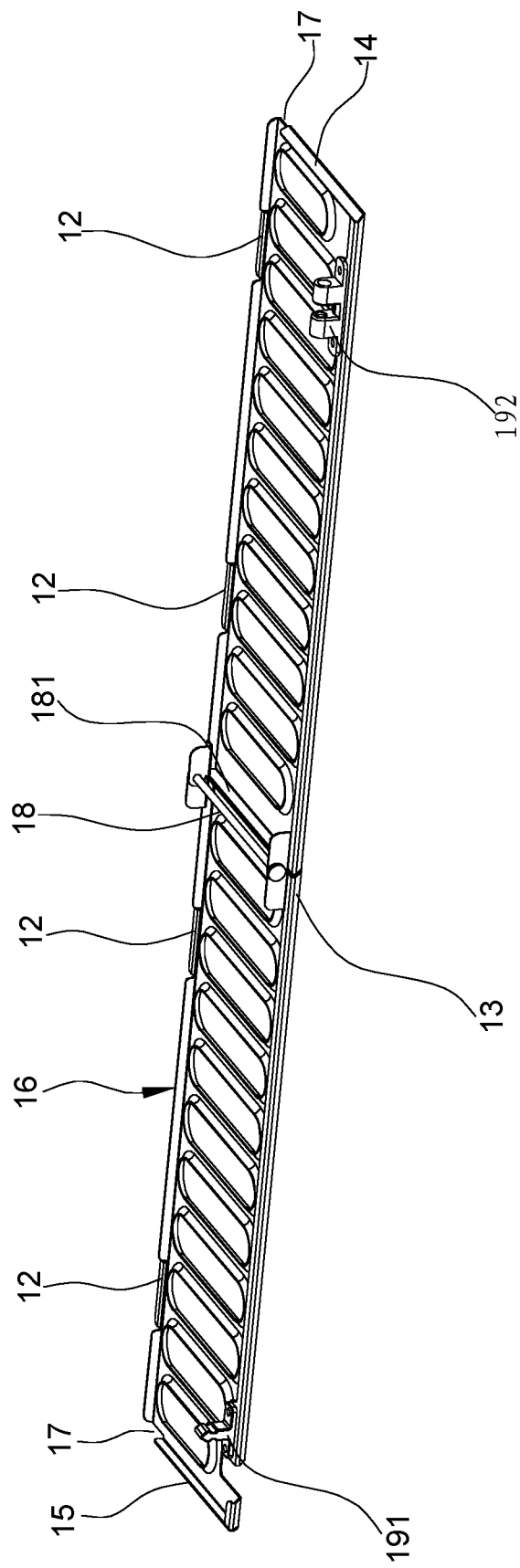
FIG. 3 is a perspective view of the smoke filter device according to the embodiment of the present invention.
Figure 4:
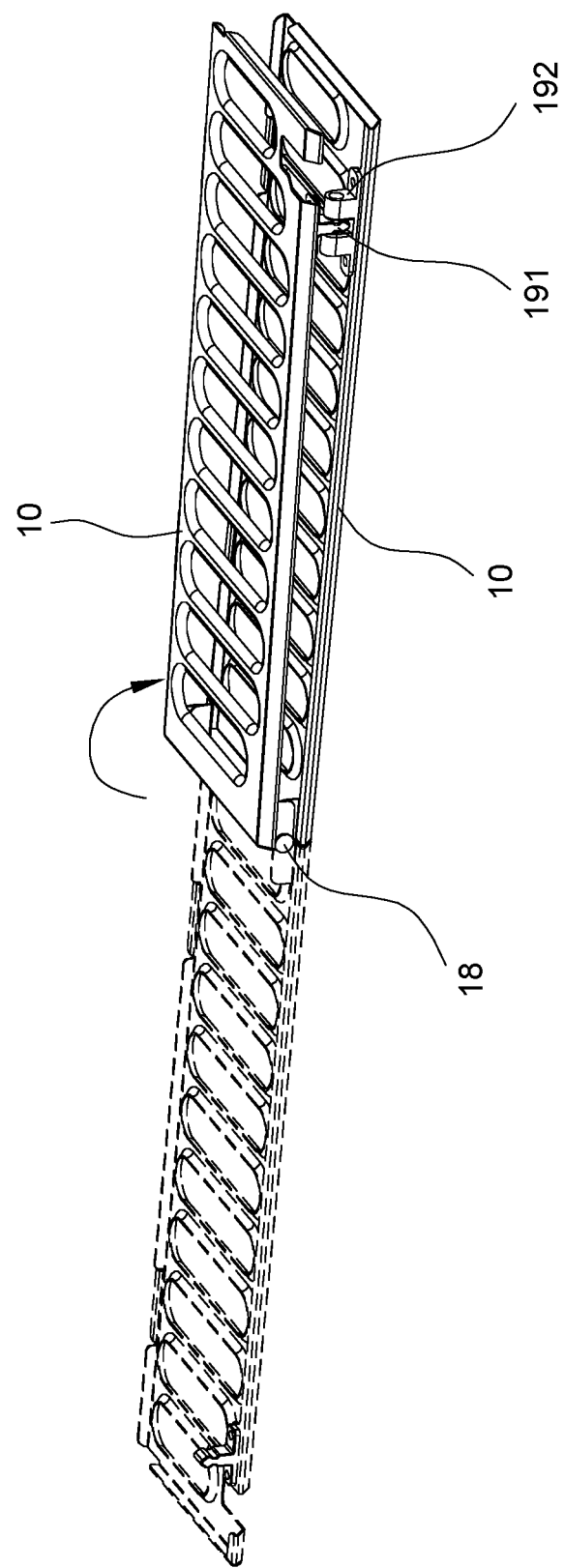
FIG. 4 is a perspective view of the smoke filter device according to the embodiment of the present invention, showing a state of folded smoke filter device.
Figure 5:
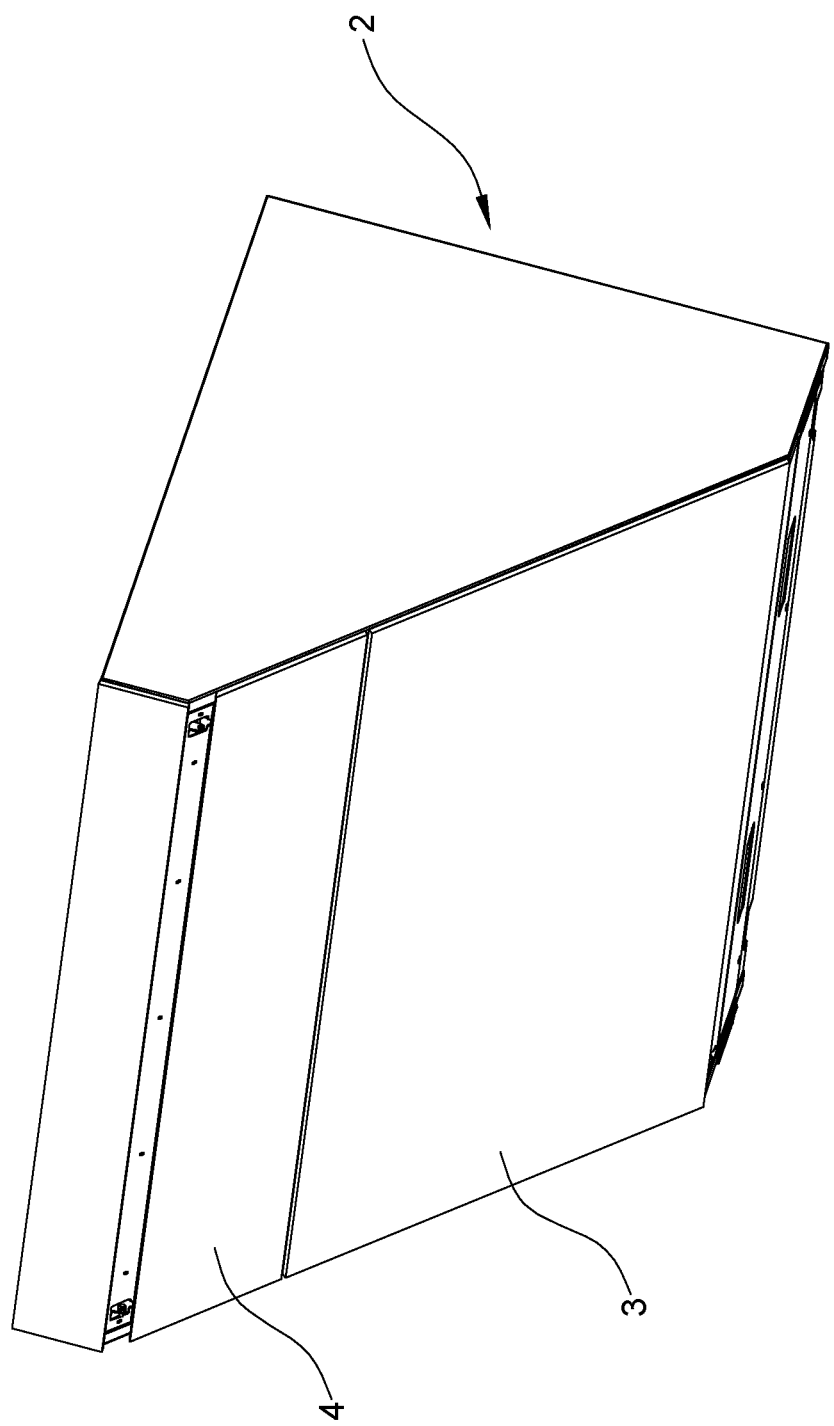
FIG. 5 is a perspective view of a range hood according to an embodiment of the present invention.
Figure 6:
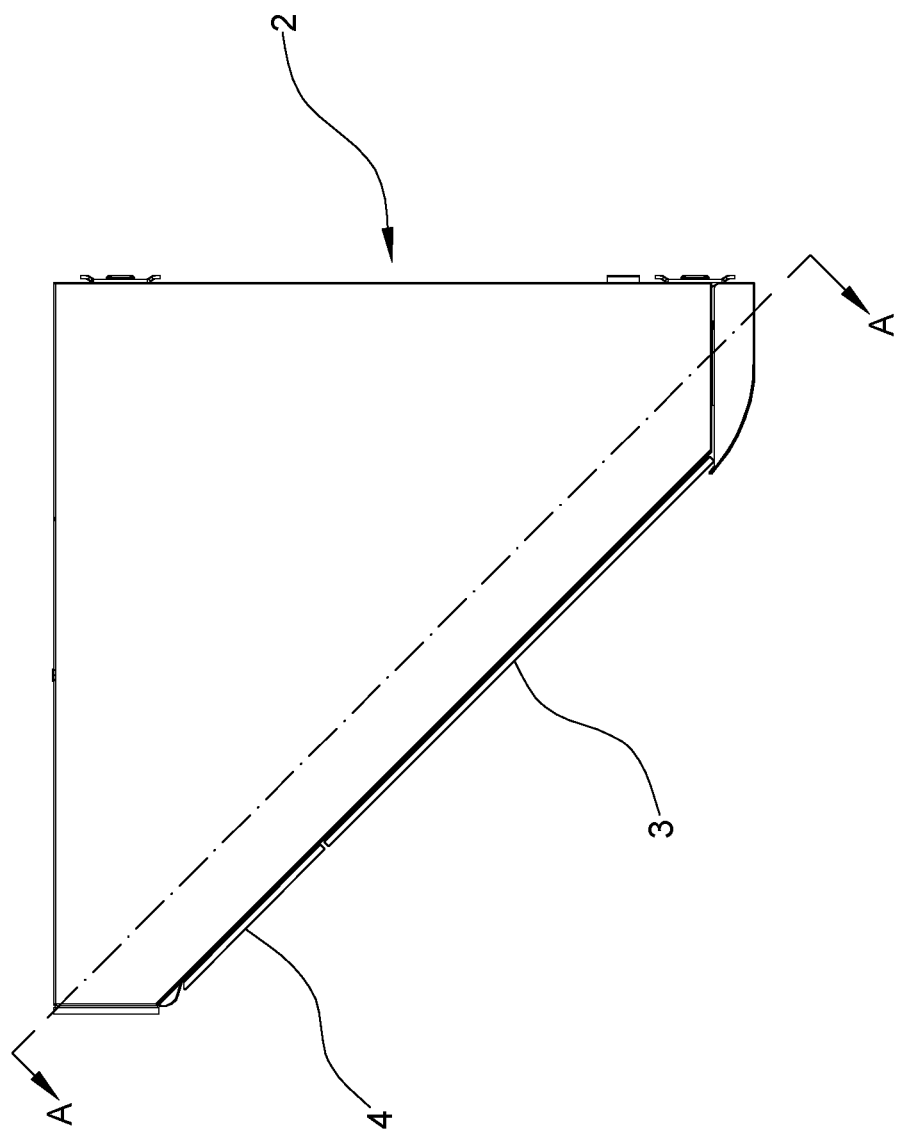
FIG. 6 is a right side view of FIG. 5.
Figure 7:
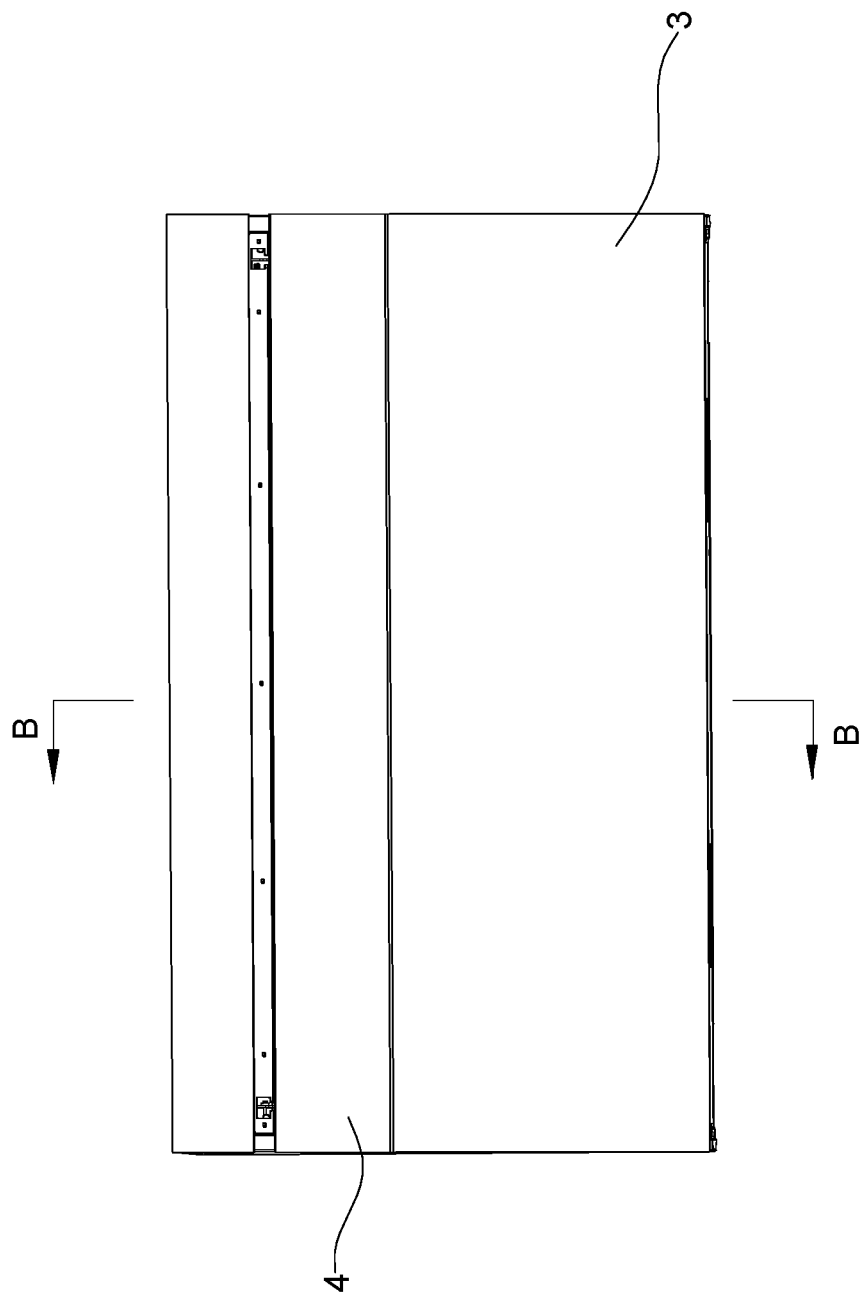
FIG. 7 is a front view of FIG. 5.
Figure 8:
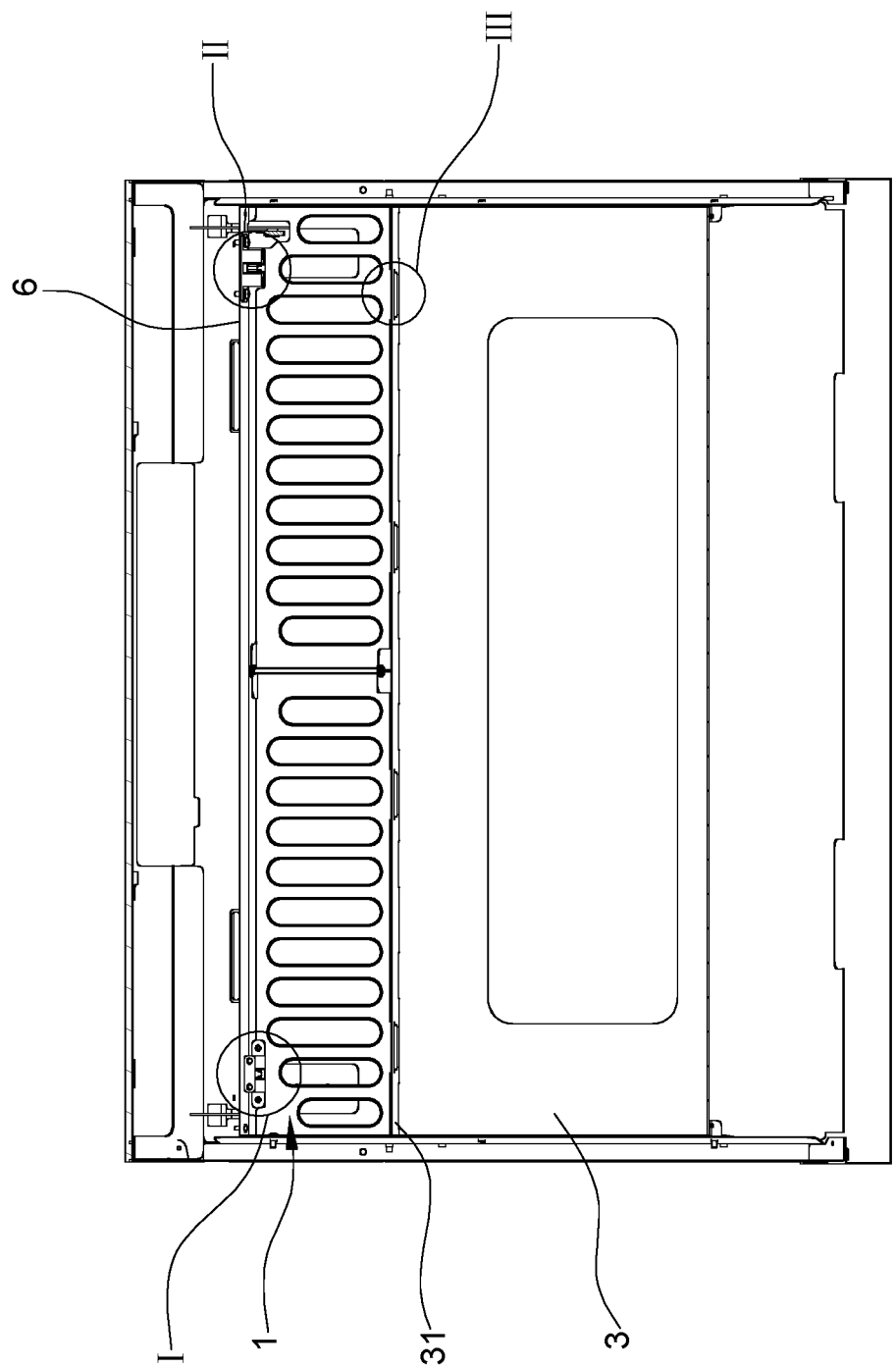
FIG. 8 is a sectional view of FIG. 6 along A-A.
Figure 9:
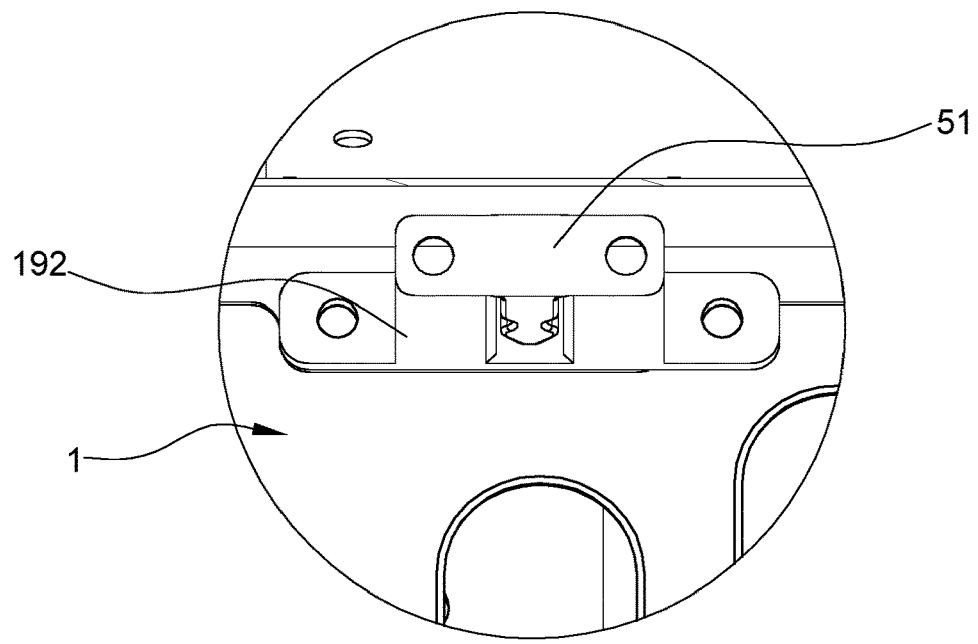
FIG. 9 is an enlarged view of part-I of FIG. 8.
Figure 10:
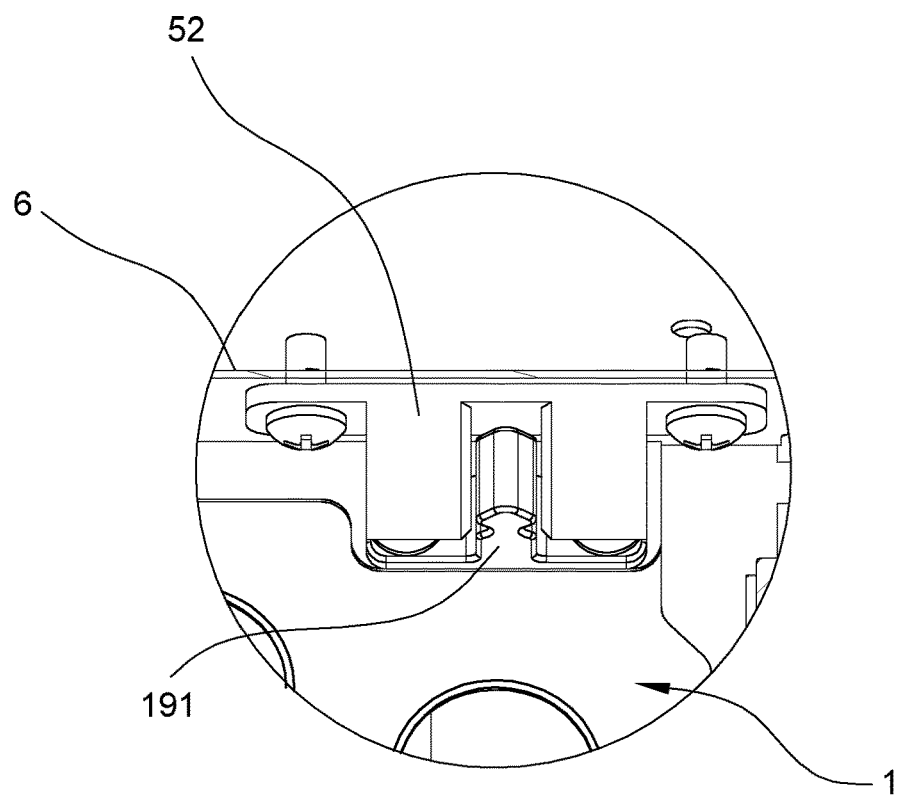
FIG. 10 is an enlarged view of part-II of FIG. 8.
Figure 11:
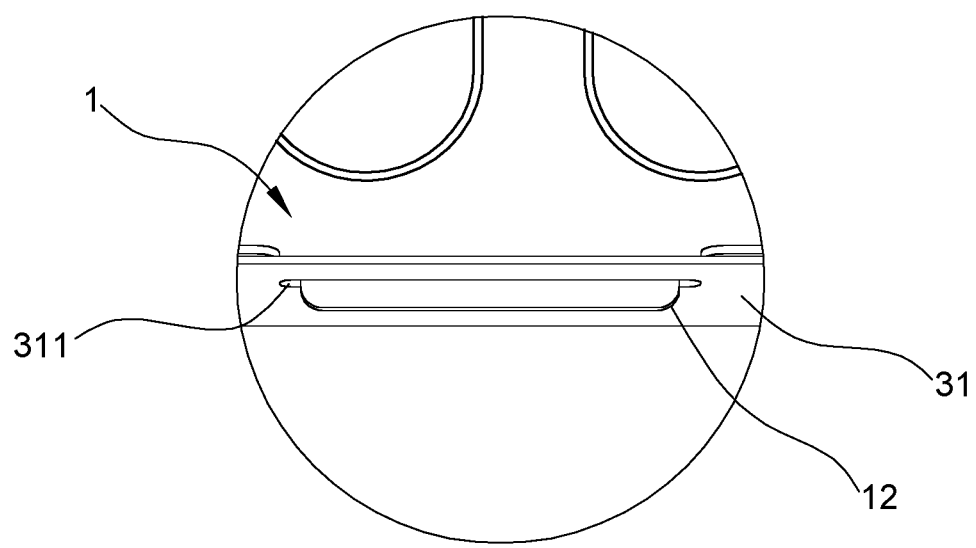
FIG. 11 is an enlarged view of part-III of FIG. 8.
Figure 12:
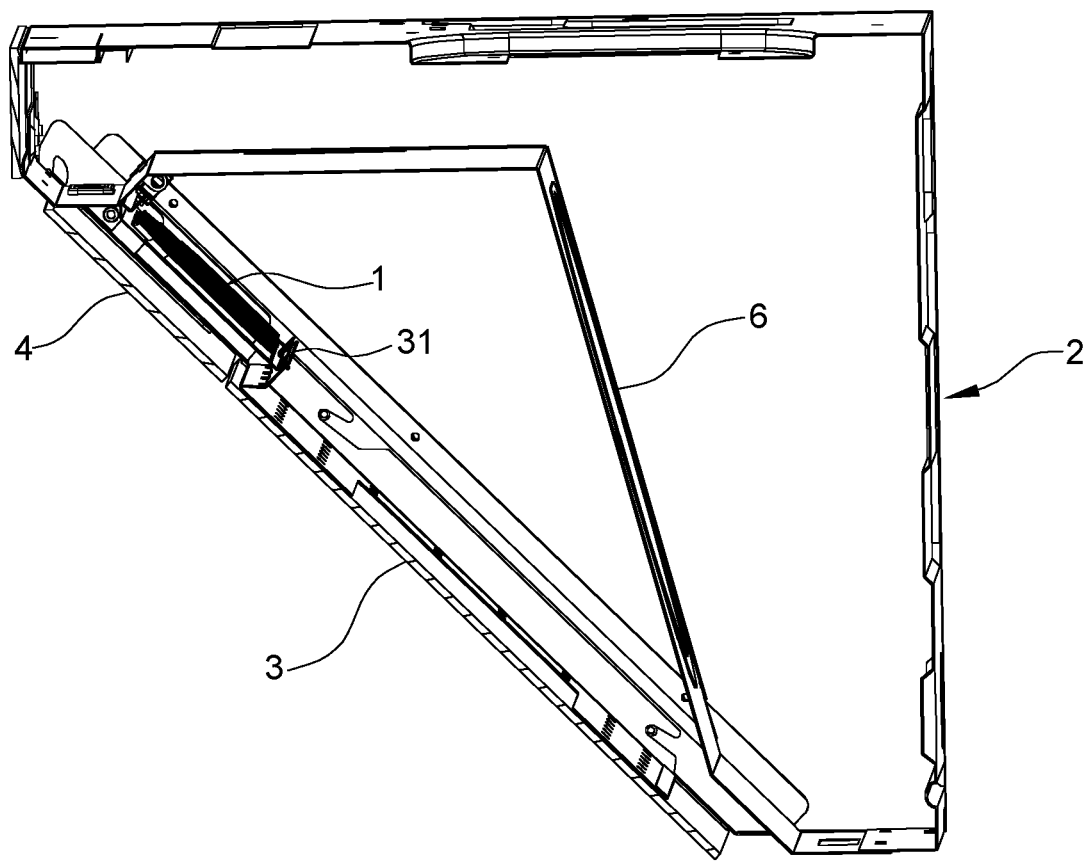
FIG. 12 is a sectional view of FIG. 7 along B-B.
Figure 13:
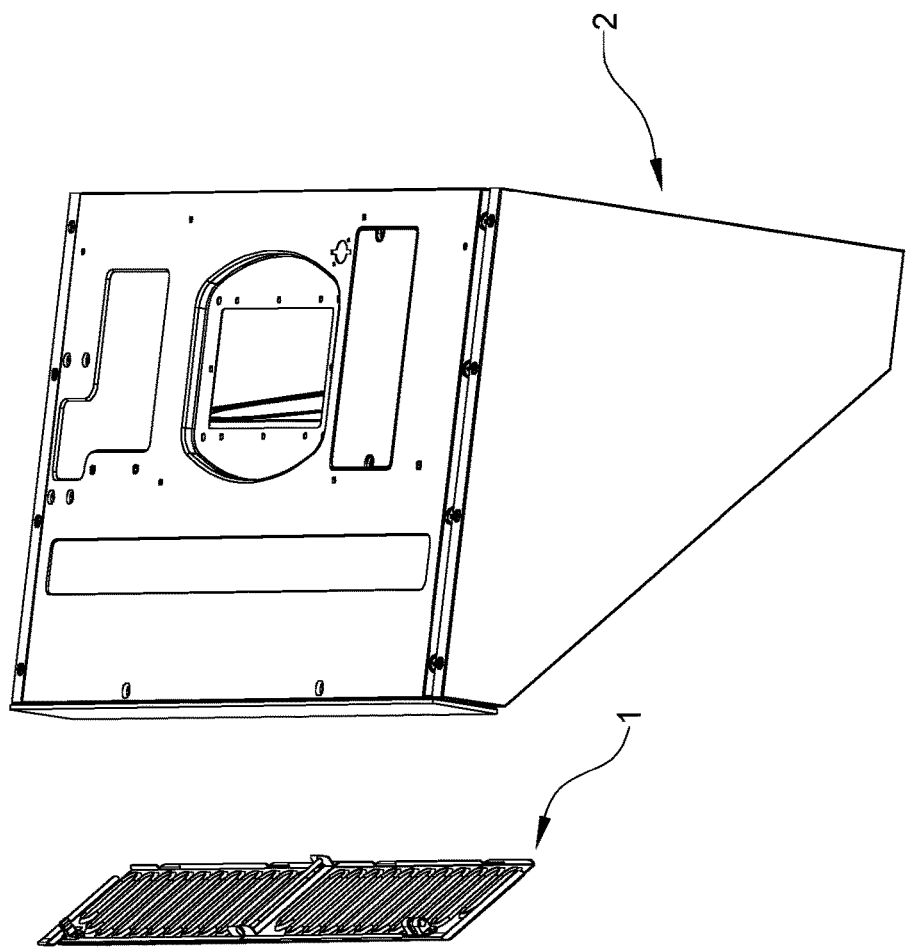
FIG. 13 is an exploded view of a partial components of the range hood according to the embodiment of the present invention (a motor, fans, and etc. are omitted)
Figure 13:
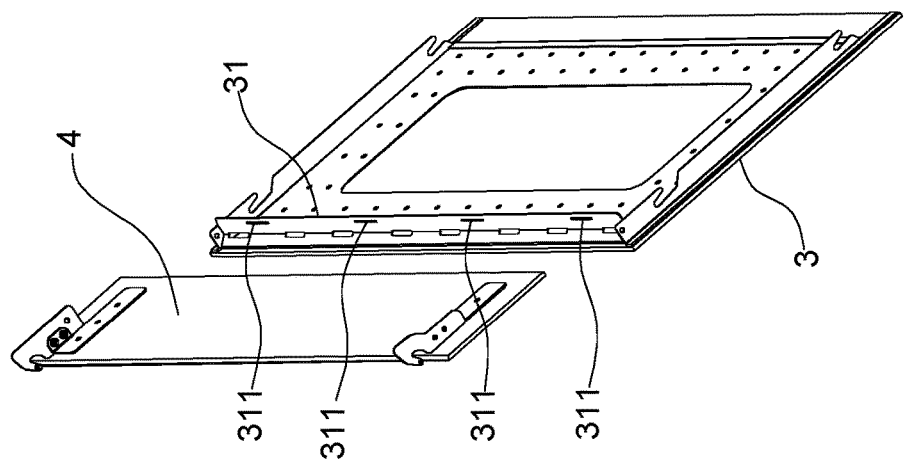
Figure 14:
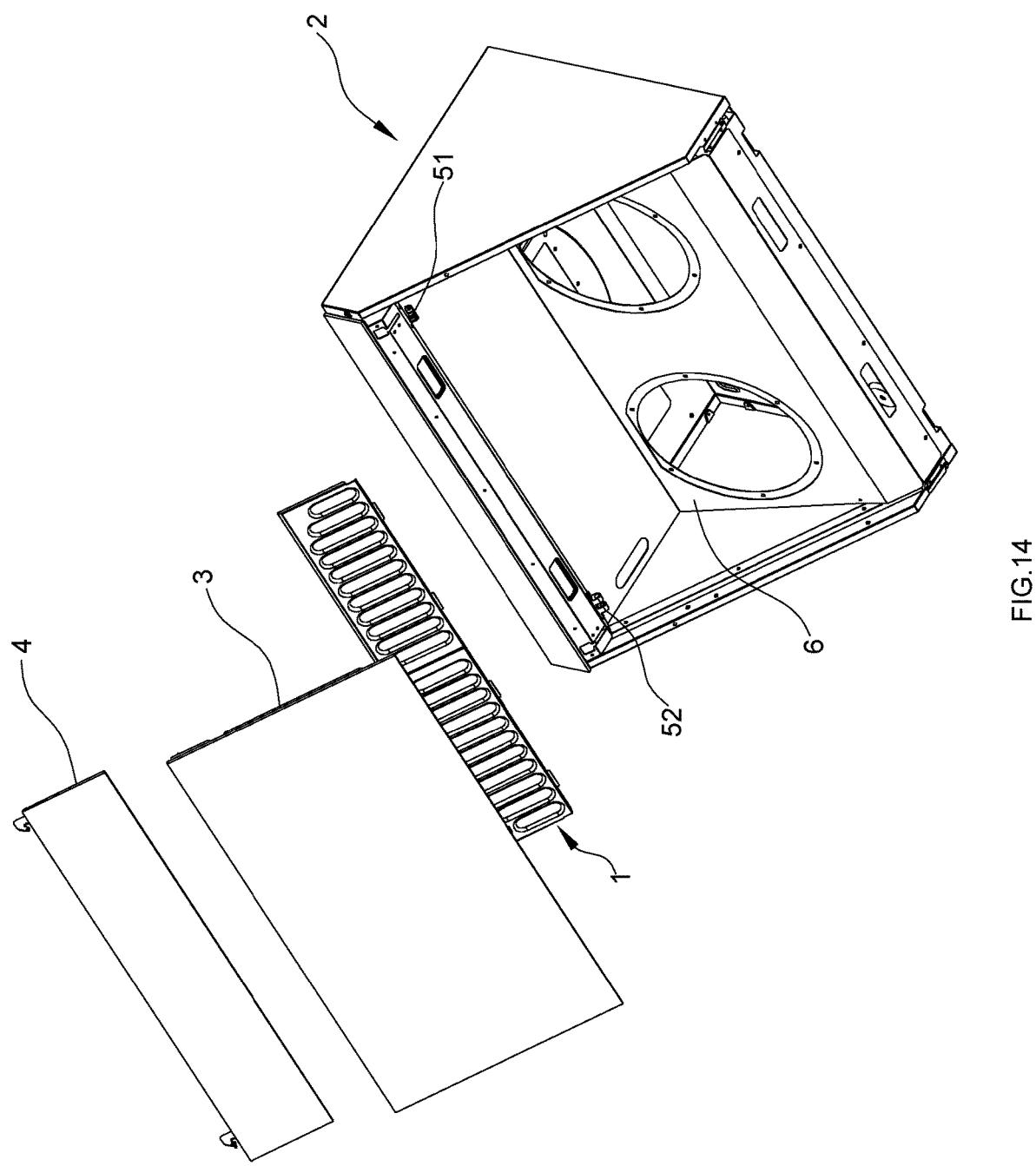
FIG. 14 is another view of FIG. 13 seen from another direction.

To enable a further understanding of the present invention content of the invention herein, refer to the detailed description of the invention and the accompanying drawings below:

FIGS. 1-4 show a smoke filter device, which is applied to a range hood which has a double-fan system. In this embodiment, the double-fan system with two fans is of a conventional structure, and the two fans are arranged left and right in the range hood.

The smoke filter device comprises a screen plate 1 with filter holes 11. The screen plate 1 has two oil filter sections 10 along a lengthwise direction of the screen plate 1. The filter holes 11 are uniformly distributed on the oil filter sections 10, the oil filter sections 10 are in one-to-one correspondence to burners of a stove, in the adjacent two filter holes 11, an area defined by the filter hole 11 near the at least one end of the oil filter section 10 is smaller than an area defined by the filter hole 11 near the middle portion of the oil filter section 10. Further, in this embodiment, the area defined by each filer hole 11 gradually decreases from the middle portion of each oil filter section 10 to two ends of the oil filter section 10, respectively.

Domestic stoves in the current market are generally stoves with two burners. Therefore, in this embodiment, there are two oil filter sections 10 which are continuously arranged in parallel on the screen plate 1 along a lengthwise direction of the screen plate 1, that is, the smoke filter device in this embodiment consists of two oil filter sections 10. Most part of smoke generated by cooking directly rises and is taken away by the range hood, and small part of smoke escapes around the burners of the stove. The smoke filter device in the present invention has oil filter sections 10 in one-to-one correspondence to the burners of the stove. In the use, the middle portion of each oil filter section 10 is in one-to-one correspondence to the burners of the stove and the air inlets of the fans of the range hood, respectively, and in the adjacent two filter holes 11, an area defined by the filter hole 11 near each end of the oil filter section 10 is smaller than an area defined by the filter hole 11 near the middle portion of the oil filter section 10. In accordance with the air volume=wind speed×air intake area, without changing the air volume, the wind speed is one of important factors that determine the suction force applied to the smoke by the filter holes 11. In this way, without changing the overall air volume, by relatively reducing the area of the filter holes 11 on both sides, the suction force applied to the smoke by the filter holes 11 on two sides of each oil filter section 10 can be relatively increased, the smoke can be effectively prevented from escaping to the surrounding, the smoke filtering effect of the smoke filter device can be improved, and the overall smoke suction effect of the range hood can be improved.

Due to the arrangement position of the double-fan structure, generally, in the operating state of the smoke filter device, the size of the suction force applied to the smoke by the filter holes on the smoke filter device is distributed in an M-shape in the lengthwise direction of the smoke filter device, that is, the maximum suction force is located at positions where the smoke filter device corresponds to the burners. Although most part of smoke generated during the cooking process directly rises and enters the smoke collecting hood 2 of the range hood by the maximum suction force of the smoke filter device, but part of smoke still escape to the surrounding. The suction force at the filter holes 11 on two sides of the smoke filter device is too low to prevent the smoke from escaping to the surrounding. This problem can be better solved by the above design in the present invention. However, the amount of smoke escaping between the two burners is less than the amount of smoke outside the two burners, particularly when the cooking operation is simultaneously performed on the two burners. Therefore, in the present invention, preferably, an area defined by each the filter holes 11 adjacent to the end of each oil filter section 10 is the smallest among all areas defined by the filter holes 11 on this oil filter section 10. In this way, in the operating state, while ensuring the suction force in the middle portion of each oil filter section 10, by properly increasing the suction force at the junction of the two oil filter sections 10, the smoke can be prevented from escaping from the stove. Accordingly, the smoke suction efficiency of the smoke filter device can be further improved, the uniformity of the suction force across the smoke filter device can be significantly improved, and the noise generated during the operation of the smoke filter device can be reduced to some extent.

Figure 15:
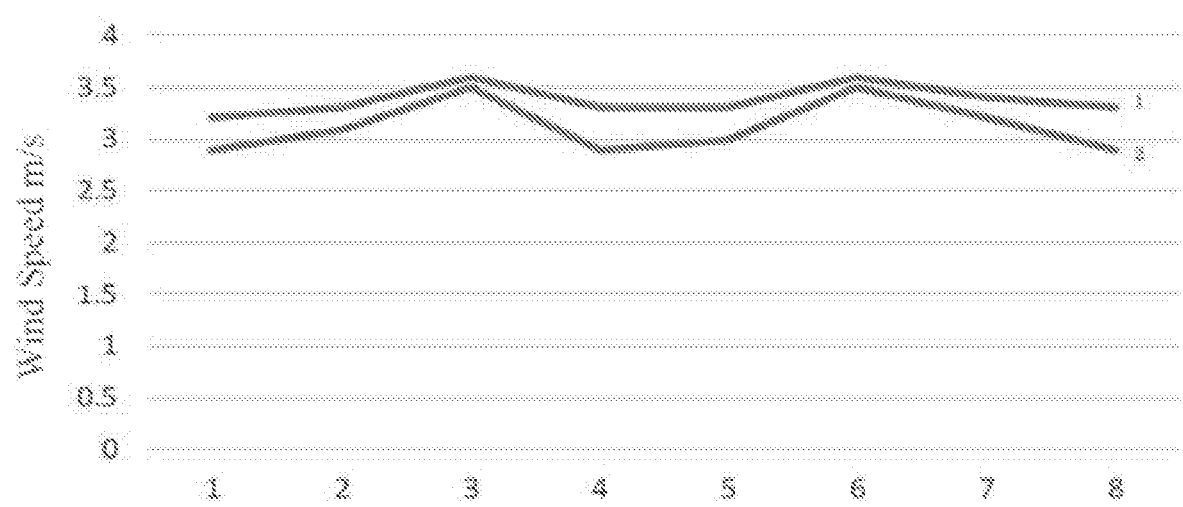
FIG. 15 shows the wind speed distribution of the smoke filter device according to an embodiment of the present invention and of a conventional smoke filter device, where curve 1 shows the smoke filter device of the present invention, and curve 2 shows the conventional smoke filter device.

To further describe the smoke suction performance of the smoke filter device structure in the present invention, the smoke filter device in the present application and of a conventional smoke filter device are tested in terms of the wind speed distribution, respectively, where the filter holes on the conventional smoke filter device are the same as the filter holes on the smoke filter device in the present invention in shape, and the filter holes on the conventional smoke filter device are equal in area. No. 3 and No. 6 in Table 1 and on the horizontal ordinate of FIG. 15 represent middle position of the oil filter sections 10, respectively, and No. 1, No. 2, No. 7 and No. 8 represent positions on two ends of the screen plate 1, respectively. Moreover, the area of the filter holes 11 on two sides of the screen plate 1 progressively decreases from inside to outside, where No. 1 and No. 8 represent two outermost positions of the screen plate 1, respectively, and No. 4 an No. 5 represent the junction of the two filter sections. It can be known from Table 1 and FIG. 15 that, compared with the conventional smoke filter device, the smoke filter device in the present application can properly increase the wind speed in the middle portion of each oil filter section 10, so that the suction force in the middle portion of each oil filter section 10 can be properly improved, and the direct adsorption effect of the smoke filter device on the smoke generated by the stove can be further improved. The wind speed at the junction of the two oil filter sections 10 and on two sides of the screen plate 1 is obviously increased, and the suction force around the middle portion of each oil filter section 10 (particularly the suction force on two sides of the screen plate 1) is obviously increased. Accordingly, the smoke trapping capacity on the outer side of the range hood is effectively enhanced, the smoke is prevented from escaping to two sides, the wind speed across the smoke filter device is increased to some extent, and the uniformity of the wind speed across the smoke filter device is obviously improved.

TABLE 1

| | No. 1 | No. 2 | No. 3 | No. 4 | No. 5 | No. 6 | No. 7 | No. 8 |
|---|---|---|---|---|---|---|---|---|
| Wind speed (m/s) distribution of the smoke filter device in the present application and of the conventional smoke filter device | | | | | | | | |
| The smoke filter device of the present invention | 3.2 | 3.3 | 3.6 | 3.3 | 3.3 | 3.6 | 3.4 | 3.3 |
| Conventional smoke filter device | 2.9 | 3.1 | 3.5 | 2.9 | 3.0 | 3.5 | 3.2 | 2.9 |

Further, the area of the filter holes 11 can be changed in various ways. Since the filter holes on the conventional smoke filter device are generally long holes, it is convenient to make improvements on the basis of the conventional smoke filter devices. Preferably, a length of each filter hole 11 extends along a widthwise direction of a corresponding oil filter section 10, and the filter holes 11 have same width. The height of the filter holes 11 on two sides of the screen plate 1 is less than the height of the filter holes 11 in the middle portion of each oil filter section 10, the height of the filter holes 11 at the junction of the two oil filter sections 10 is greater than the height of the filter holes 11 on the two outermost sides of the screen plate 1 but less than the height of the filter holes 11 in the middle portion of each oil filter section 10, and the height of the filter holes 11 on two sides of the screen plate 1 progressively decreases from inside to outside. Specifically, the filter holes 11 comprise first filter holes 111, second filter holes 112 and third filter holes 113. The height of the first filter holes 111 is greater than that of the second filter holes 112, the height of the second filter holes 112 is greater than that of the third filter holes 113, and the height ratio to the first filter holes 111 to the second filter holes 112 to the third filter holes 113 is 18:15-17:12-14. In this embodiment, the height of the first filter holes 111 is 92 mm, the height of the second filter holes 112 is 82 mm, and the height of the third filter holes 113 is 67 mm. The lower ends of the filter holes 11 on each oil filter section 10 are flush with each other; and, the first filer holes 111 are formed in the middle portion of each oil filter section 10, the second filter holes 112 are formed on left and right side of each of the first filter holes 111, the third filter holes 113 are formed on one side of one of the second filter holes 112, and the ends of the oil filter sections 10 without the third filter holes 113 are connected to each other. In this embodiment, there are eight first filter holes 111 formed on each oil filter section 10, one second filter hole 112 is formed on one side of each of the first filter holes 111, and one third filter hole 113 is formed on an adjacent side of one of the second filter holes 112.

Since the existing smoke filter devices are generally long, it is inconvenient for cleaning, for example, cleaning in a sink or automatically cleaning in a dishwasher. Therefore, preferably, the screen plate 1 is divided into multiple oil filter sections 10, each oil filter section 10 is in plate, and two adjacent oil filter sections 10 are movably connected with each other. Thus, the smoke filter device can be folded after removed from the range hood, and it is convenient for the user to clean the smoke filter device. Further, each the oil filter section 10 can flip to be superimposed with the adjacent oil filter section 10. By folding the smoke filter device, the length of the smoke filter device can be minimized. Accordingly, the overall length of the smoke filter device can be reduced to the length of a single oil filter section 10. In this way, it is greatly convenient for the user to clean the smoke filter device, and the user can directly clean the folded smoke filter device in a sink. Moreover, since the length is greatly reduced, the folded smoke filter device can also be directly put in a dishwasher to be automatically cleaned. To prevent the folded smoke filter device from unfolding during the cleaning process due to the relative rotation of the oil filter sections 10, a locking mechanism is disposed on the screen plate 1. The locking mechanism at least comprises: a first locking member 191 and a second locking member 192, which are separately disposed on two adjacent oil filter sections 10. When two adjacent oil filter sections 10 are superimposed with each other, the first locking member 191 and the second locking member 192 can be locked with each other. Preferably, the first locking member 191 is a touch buckle, and the second locking member 192 is a touch buckle seat into which the touch buckle is clamped therein. The touch buckle can be clamped into the touch buckle seat immediately when the smoke filter device is folded, so that the smoke filter device is easily locked. In this embodiment, the rotatable connection of the two oil filter sections 10 is realized by a rotary pin shaft 18 arranged in the widthwise direction of the smoke filter device, and opposite side edges of the two oil filter sections 10 extend toward the back side to form limiting flangings 181, respectively. When the two oil filter sections 10 are rotated to a flat state, the two limiting flangings 181 can be resisted against each other, so that the relative rotation of the two oil filter sections 10 is limited. That is, in this embodiment, the rotation angle of the relative rotation of the two oil filter sections 10 is limited at 0° to 180°.

FIGS. 5-14 show a range hood, to which the smoke filter device described above is applied. The range hood comprises: a smoke collecting hood 2. A panel 3, a smoke baffle 4 and the smoke filter device are disposed on the smoke collecting hood 2. An oil guide plate 6 is disposed within the smoke collecting hood 2. The smoke filter device is disposed above the panel 3, and the smoke baffle 4 is rotatably disposed above the smoke filter device. In an operating state, the smoke baffle 4 is rotated to expose the smoke filter device; while in a non-operating state, the smoke baffle 4 shields the smoke filter device. One of the upper and lower ends of the screen plate 1 is in plug-in or snap-in connection to a top end of the panel 3, while the other one thereof is in plug-in or snap-in connection to an upper end of the oil guide plate 6. Specifically, a pin 12 protrudes downward from the lower end of the screen plate 1, a through hole 311 into which the pin 12 is inserted is formed on the top of the panel 3, and the through hole 311 is wider than the length of the pin 12. The upper end of the screen plate 1 and the upper end of the oil guide plate 6 form a snap connection through a snap mechanism. The snap mechanism comprises a first snap fastener 51 disposed at the upper end of the screen plate 1 and a second snap fastener 52 disposed at the upper end of the oil guide plate 6. The first snap fastener 51 is one of a touch buckle and a touch buckle seat, and the second snap fastener 52 is the other one of the touch buckle and the touch buckle seat. Since the pin 12 is in clearance fit with the through hole 311, during the mounting of the smoke filter device, first, the pin 12 is inserted into the through hole 311. Due to the clearance fit of the pin 12 with the through hole 311, by adjusting the position of the smoke filter device, the first snap fastener 51 can be successfully snapped with the second snap fastener 52. Then, the smoke filter device is mounted.

In this embodiment, the snap mechanism is disposed at two positions. At one position, the first snap fastener 51 is the first locking member 191 (specifically a touch buckle)

disposed on one oil filter section 10, and the second snap fastener 52 is a touch buckle seat disposed on the oil guide plate 6 and used for allowing the first locking member 191 to be clamped therein. Correspondingly, at the other position, the first snap fastener 51 is a second locking member 192 (specifically a touch buckle seat) disposed on the other oil filter section 10, and the second snap fastener 52 is a touch buckle disposed on the oil guide plate 6 and used for allowing the second locking member 192 to be clamped therein. In the present invention, the touch buckle and the touch buckle seat are conventional structures.

Further, a mounting plate 31 protrudes toward an inner cavity of the smoke collecting hood 2 is disposed at the top end of the panel 3 in the lengthwise direction of the panel 3, the through hole 311 is formed on the mounting plate 31, and the pin 12 is platy and formed by extending the surface of the screen plate 1 downward. Thus, oil liquid accumulated on the smoke filter device can flow to the back of the panel 3 through the through hole 311 along the pin 12 and then flow into an oil cup from the back of the panel 3. Preferably, a top edge of the screen plate 1 obliquely extends upward towards the back side of the screen plate in the lengthwise direction of the screen plate to form an upper flanging 13. Accordingly, the accumulation of oil liquid on the top of the smoke filter device can be avoided, and the top of the smoke filter device can be further prevented from adhering to the oil guide plate 6 if the smoke filter device has been not cleaned for a long period of time.

Furthermore, a left side edge, a right side edge and a lower edge of the screen plate 1 extend towards the back side of the screen plate to form a left flanging 15, a right flanging 14 and a lower flanging 16, respectively; and, upper ends of the left flanging 15 and the right flanging 14 are integrally connected to a corresponding end of the upper flanging 13, and oil guide gaps 17 are formed between a lower end of the left flanging 15 and the corresponding end of the lower flanging 16 and between a lower end of the right flanging 14 and the corresponding end of the lower flanging 16, respectively. The range hood can be slightly inclined during the actual mounting process. In this case, oil liquid will be accumulated and condensed at a lower position on the back of the smoke filter device. In the present invention, by providing the oil guide gaps 17, oil liquid on the back of the smoke filter device can be allowed to flow to the back of the panel 3 through the oil guide gaps 17 and then flow into the oil cup. In addition, the pin 12 is flaky and is bent and extended from a part of the plate body of the lower flanging 16 in a vertical downward direction. As a result, the pin 12 can better guide the oil liquid on the smoke filter device to flow to the back of the panel 3, and the oil liquid is more smoothly collected in the oil cup.

The invention claimed is:

1. A smoke filter device, comprising:
a plurality of oil filter sections (10) each having a middle portion and two ends, and
a screen plate (1), and the plurality of oil filter sections (10) are arranged in parallel on the screen plate (1) along a lengthwise direction of the screen plate (1), wherein,
each oil filter section (10) has at least two filter holes (11), which are arranged in parallel along a lengthwise direction of the oil filter section (10); and
an area defined by each filter hole (11) gradually decreases from the middle portion of each oil filter section (10) to at least one end of the oil filter section (10).

2. The device of claim 1, wherein the area defined by each filter hole (11) respectively gradually decreases from the middle portion of each oil filter sections (10) to each end of the oil filter section (10).

3. The device of claim 1, wherein two oil filter sections (10) are contiguously arranged along the lengthwise direction of the screen plate (1), and an area defined by each the filter holes (11) adjacent to the end of each oil filter section (10) is the smallest among all areas defined by the filter holes (11) on this oil filter section (10).

4. The device of claim 1, wherein a length of each filter hole (11) extends along a widthwise direction of a corresponding oil filter section (10), and the filter holes (11) have same width.

5. The device of claim 1, wherein the screen plate (1) is divided into multiple oil filter sections (10), each the oil filter sections (10) is in plate, and two adjacent oil filter sections (10) are movably connected with each other.

6. The device of claim 5, wherein each the oil filter section (10) can flip to be superimposed with the adjacent oil filter section (10).

7. The smoke filter device of claim 6, wherein a locking mechanism is disposed on the screen plate (1), the locking mechanism comprises:
a first locking member (191) and a second locking member (192), which are separately disposed on two adjacent oil filter sections;
when two adjacent oil filter sections (10) are superimposed with each other, the first locking member (191) and the second locking member (192) can be locked with each other.

8. The device of claim 7, wherein the first locking member (191) is a touch buckle, and the second locking member (192) is a touch buckle seat into which the touch buckle is clamped therein.

9. A range hood with the smoke filter device of claim 1.

10. The range hood of claim 9, wherein the range hood comprises:
a smoke collecting hood (2);
a panel (3) and the smoke filter device, which are disposed on the smoke collecting hood (2);
an oil guide plate (6) disposed within the smoke collecting hood (2);
the smoke filter device is disposed above the panel (3); and
one of the upper and lower ends of the screen plate (1) is in plug-in or snap-in connection to a top end of the panel (3), while the other one thereof is in plug-in or snap-in connection to an upper end of the oil guide plate (6).

11. The range hood of claim 10, wherein
a pin (12) protrudes downward from the lower end of the screen plate (1);
a through hole (311) into which the pin (12) is inserted is formed on the top of the panel (3), and the through hole (311) is wider than the length of the pin (12);
the upper end of the screen plate (1) and the upper end of the oil guide plate (6) form a snap connection through a snap mechanism;
the snap mechanism comprises a first snap fastener (51) disposed at the upper end of the screen plate (1) and a second snap fastener (52) disposed at the upper end of the oil guide plate (6); and,
the first snap fastener (51) is one of a touch buckle and a touch buckle seat, while the second snap fastener (52) is the other one of the touch buckle and the touch buckle seat.

12. The range hood of claim 11, wherein a mounting plate (31) protrudes toward an inner cavity of the smoke collecting hood (2) is disposed at the top end of the panel (3) in the lengthwise direction of the panel (3);
- the through hole (311) is formed on the mounting plate (3); and
- the pin (12) is platy and formed by extending the surface of the screen plate (1) downward.

13. The range hood of claim 12, wherein a top edge of the screen plate (1) obliquely extends upward towards the back side of the screen plate (1) in the lengthwise direction of the screen plate (1) to form an upper flanging (13).

14. The range hood of claim 13, wherein a left side edge, a right side edge and a lower edge of the screen plate (1) extend towards the back side of the screen plate (1) to form a left flanging (15), a right flanging (14) and a lower flanging (16), respectively;
- upper ends of the left flanging (15) and the right flanging (14) are integrally connected to a corresponding end of the upper flanging (13); and,
- oil guide gaps (17) are formed between a lower end of the left flanging (15) and a corresponding end of the lower flanging (16) and between a lower end of the right flanging (14) and the corresponding end of the lower flanging (16), respectively.

\* \* \* \* \*